United States Patent [19]
Robertson

[11] 3,945,981
[45] Mar. 23, 1976

[54] LIGHT STABLE POLYURETHANE ELASTOMER PREPARED FROM ALIPHATIC ISOCYANATE USING THIO TIN ORGANIC COMPOUND CONTAINING SULFUR ATTACHED TO TIN AS HEAT ACTIVATED CATALYST

[75] Inventor: John R. Robertson, Newtown, Conn.

[73] Assignee: Uniroyal, Inc., New York, N.Y.

[22] Filed: Nov. 8, 1974

[21] Appl. No.: 522,183

[52] U.S. Cl. ...... 260/75 NB; 156/238; 260/77.5 AB; 427/385
[51] Int. Cl.² ............... C08G 18/24; B05D 7/26
[58] Field of Search .. 260/2.5 AB, 75 NB, 77.5 AB, 260/2.5 AY; 156/238; 427/385

[56] References Cited
UNITED STATES PATENTS

| | | | |
|---|---|---|---|
| 3,148,162 | 9/1964 | Gmitter et al. | 260/2.5 AB |
| 3,194,770 | 7/1965 | Hostettler | 260/77.5 AB |
| 3,240,730 | 3/1966 | Hostettler et al. | 260/2.5 AB |
| 3,351,573 | 11/1967 | Skreckoski | 260/18 TN |
| 3,392,153 | 7/1968 | Hostettler et al. | 260/77.5 AB |
| 3,539,424 | 11/1970 | Tashlick | 156/238 |
| 3,897,401 | 7/1975 | Ringler et al. | 260/77.5 AB |

*Primary Examiner*—H. S. Cookeram
*Attorney, Agent, or Firm*—James J. Long

[57] ABSTRACT

A light stable polyurethane elastomer is prepared in the absence of solvent from a polyol, a chain extender and an aliphatic polyisocyanate using a thio tin organic compound, containing sulfur directly attached to the tin, as a heat activated catalyst. E.g., a solventless liquid composition comprising an hydroxy-terminated polyester, a chain extender, and hydrogenated MDI, containing dibutyltin S,S-bis(isooctyl mercaptoacetate) as a catalyst, has a pot life in excess of 25 minutes at room temperature but upon heating 1 minute at 375°F. gels to a solid state. Because of this combination of long pot life and rapid cure, the composition is suitable for such applications as making coated fabrics and films, and in other liquid processing techniques, e.g., rotational casting, liquid injection molding, and the like.

37 Claims, No Drawings

LIGHT STABLE POLYURETHANE ELASTOMER PREPARED FROM ALIPHATIC ISOCYANATE USING THIO TIN ORGANIC COMPOUND CONTAINING SULFUR ATTACHED TO TIN AS HEAT ACTIVATED CATALYST

This invention relates to a polyurethane elastomer composition and to a method of making shaped articles therefrom.

It is desirable to have a liquid polyurethane system which would have long pot life at ambient temperature but yet could be activated by heating to produce a rapid cure when desired. Phenyl mercury propionate is a catalyst which, in a liquid polyurethane formulation based on the aromatic isocyanate MDI [methylene bis(4-phenylisocyanate)] gives a prolonged pot life of approximately 30 minutes at room temperature yet gives a rapid cure of one minute at 375°F. Unfortunately, this desirable long pot life/short cure time combination is not obtained when such mercury catalysts are used with the aliphatic isocyanates that are necessary for light stable polyurethanes.

Urethane coated fabrics are generally produced from either solvent based or 100% reactive non-light stable polyurethane compositions using aromatic polyisocyanates. These systems give rise to discoloration in use caused by the interaction of the aromatic polyisocyanate with light. Light stable systems based on wholly reacted polymers from aliphatic polyisocyanates are available as solvent solutions. The attendant problem with solvents, cost, pollution, safety, solvent recovery, all make such systems undesirable. Consequently there is a need for a solvent-free light stable liquid polyurethane system. It is desirable that such solventless liquid system be utilizable on conventional vinyl casting or coating apparatus. This requires a catalyst which provides both long pot life (to prevent gelation during coating, allow for equipment slow down, and easy clean up) and a rapid cure at conventional vinyl temperatures (e.g., 1 min. at 300°–400°F.) to minimize the oven length needed.

Unfortunately, the mercury catalysts useful with aromatic isocyanates are ineffective with aliphatic isocyanates, producing very weak improperly cured films. Furthermore mercury catalysts are a health hazard and are restricted in use by Federal and state laws. Delayed action amine catalysts have also been found to be ineffective. On the other hand, conventional tin catalysts such as dibutyl tin dilaurate and stannous octoate produce good quality polyurethane elastomers from the aliphatic isocyanate hydrogenated MDI. The reaction is very rapid however, giving a pot life of less than 15 minutes which is unacceptable for factory processing by normal practical techniques.

The present invention is based on the surprising discovery that, in a light stable solvent free urethane elastomer composition based on aliphatic isocyanate, a thio-tin organic compound containing sulfur directly attached to tin serves as a heat activated catalyst which gives long pot life at ambient temperature, in combination with rapid cure at elevated temperature, to produce a film, coating, casting, or the like having excellent physical properties. This is particularly unexpected in view of the fact that these same thio tin organic compounds containing sulfur directly attached to tin do not give a long pot life with urethane compositions based on aromatic isocyanates, such as MDI and TDI.

With aromatic isocyanates the instant catalysts merely act in the same way as conventional tin catalysts such as dibutyl tin dilaurate, that is, the pot life is too short for practical factory processing. The critical nature of the presently employed catalyst is emphasized by the fact that various organo tin compounds containing sulfur in the organic structure but not directly attached to the tin do not catalyze the present urethane system at all, i.e., it could not be cured after 3 minutes in a 350°F. oven.

U.S. Pat. No. 3,392,128, Hostettler et al., July 9, 1968, discloses catalysts for polyurethane compositions which are organo tin compounds having at least one carbon to tin bond, preferably with intensifying bonds from tin to halogen, hydrogen, oxygen, sulfur, nitrogen or phosphorus atoms. Among the numerous compounds listed by Hostettler et al. is dibutyltin bis(octyl thioglycolate) [also called dibutyltin bis(octyl mercaptoacetate)]. Rapid cure under ambient conditions is emphasized by Hostettler et al. (which is of course contrary to the present invention).

U.S. Pat. No. 3,391,091, Considine et al., July 2, 1968, utilizes various organo tin compounds including mercaptides as gel catalysts in a polyurethane foam composition which gels in 70–130 seconds under ambient conditions, in contrast to the long pot life of the instant composition.

U.S. Pat. No. 3,351,573, Skreckoski, Nov. 7, 1967, discloses a catalyzed storage-stable quick drying coating composition which is a solvent solution of a polyurethane-polyisocyanate film-forming material (ratio of NCO to OH between 1.5 and 2.2). Organo tin catalysts disclosed include dibutyl tin dilaurylmercaptide [also called dibutyl tin S,S-bis(dodecyl mercaptide)]. The Skreckoski polyurethane is a solution of a moisture-curing isocyanate-terminated prepolymer made with a large excess of isocyanate and becomes thermoset (cross-linked) during cure, whereas the present composition, made with approximately equivalent amounts of polyol and isocyanate, is a one-shot formulation which typically becomes chain extended to a non-crosslinked thermoplastic state during the curing step.

Additional prior practices are disclosed in U.S. Pat. Nos. 2,951,060, 2,991,183, 3,198,757, 3,300,417, 3,342,758, 3,539,424, 3,645,927 and 3,723,367.

The heat activated catalysts employed in the invention to provide a liquid polyurethane composition which has a pot life of at least 25 minutes at room temperature but which cures rapidly at elevated temperature are thio tin organic compounds, containing sulfur attached to tin, which may be represented by the formula

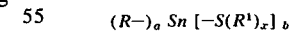

$$(R-)_a \, Sn \, [-S(R^1)_x]_b$$

wherein:

R is an organic radical, especially a hydrocarbon radical, preferably an alkyl radical (having for example 3 to 10 carbon atoms);

$R^1$ is an organic radical, whether a hydrocarbon radical such as alkyl having 4 to 20 carbon atoms or a non-hydrocarbon radical such as $-R^2COOR^3$ wherein $R^2$ is for example $(CH_2)_n$ (n being from 1 to 5) and $R^3$ is for example alkyl having 4 to 18 carbon atoms;

$x$ is 0 or 1, $a$ is 2 or 3, and $b$ is 1 or 2.

Examples of such catalysts are dibutyltin S,S-bis-(isooctyl thioglycolate) [also called dibutyltin S,S-bis- (isooctyl mercaptoacetate)], dibutyltin S,S-bis (dodecyl mercaptide), di(n-octyl)tin S,S-bis(isooctyl thioglycolate), dibutyltin sulfide, and the like, as represented by such commercially available preparations as Thermolite 31, Thermolite 20, Thermolite 831, Thermolite 66 (trademarks), etc.

Ordinarily the polyurethane formulation employed in the invention comprises a macropolyol (frequently a macroglycol), a low molecular weight polyol chain extender, and an aliphatic polyisocyanate, especially a cycloaliphatic polyisocyanate, combined to form a one-shot liquid reaction mixture along with the catalyst. The macropolyol employed may be any conventional macropolyol suitable for preparing thermoplastic polyurethanes, whether of the polyether type, or polyester type (including combinations thereof).

The macropolyol usually has an equivalent weight of 100 to 3000, preferably in the 500-2000 range. Frequently the macropolyol has an hydroxyl number of 20-600, preferably 30-120 (particularly for polyurethanes useful for coating fabrics).

The polyether types of macropolyols include, as is well known to those skilled in the art, poly(oxyalkylene)glycols [e.g., poly(oxyethylene)glycol, poly(oxypropylene) glycol, poly(oxytetramethylene) glycol, etc.] and higher polyether polyols, such as triols [e.g. poly(oxypropylene)triol], including polyether polyols of higher functionality than three [e.g., poly(oxypropylene adducts of pentaerythritols), poly(oxypropylene adducts of sorbitol)]. The above-mentioned polyether glycols are preferred. Mention may be made of such liquid polyether polyols as poly(oxypropylene)-poly(oxyethylene)glycol, poly(oxypropylene) adducts of trimethylol propane, poly (oxypropylene)-poly(oxyethylene) adduct of trimethylolpropane, poly(oxypropylene) adducts of 1,2,6-hexanetriol, and poly(oxypropylene) adducts of glycerin.

The polyester types of macropolyols are likewise well known in the art and require no detailed description here. It will be understood that they include chain extended polyesters made from a glycol (e.g., ethylene and/or propylene glylol) and a saturated dicarboxylic acid (e.g., adipic acid). By way of non-limiting example there may be mentioned poly(ethylene adipate) glycol, poly(propylene adipate)glycol, poly(butylene adipate) glycol, poly(caprolactone) glycol, poly(ethylene adipatephthalate) glycol, poly(neopentyl sebacate) glycol, etc. Small amounts of tri-alcohols such as trimethylolpropane or trimethylolethane may be included in the liquid polyester preparation. Polyester polyols with functionalities of three or more [e.g., glycerides of 12-hydroxystearic acid] may be used. Suitable polyester polyols include those obtainable by reacting any of the compounds mentioned hereinbelow under chain extenders with such dicarboxylic acids as adipic acid, succinic acid, glutaric acid, azelaic acid, sebacic acid, malonic acid, maleic acid, fumaric acid, phthalic acid, isophthalic acid, terephthalic acid, tetrachlorophthalic acid, and chlorendic acid; the acid anhydrides and acid halides of these acids may also be used; blends of acids may be used.

With respect to the polyisocyanates employed in the invention, the term "aliphatic polyisocyanate" is intended to include open chain, cycloaliphatic and aralphatic polyisocyanates. Examples of aliphatic polyisocyanates which may be used are tetramethylene-1,4-diisocyanate, hexamethylene-1,6-diisocyanate, 1-methyl-2,4- and 1-methyl-2,6-diisocyanatocyclohexane and mixtures thereof, p-xylylene diisocyanate and m-xylylene diisocyanate (XDI) and mixtures thereof, 4,4'-diisocyanato-dicyclohexyl-methane[hydrogenated MDI, also called HMDI or methylene bis(4-cyclohexylisocyanate)], isophorone diisocyanate, 2,2,4- and 2,4,4-trimethylhexamethylene diisocyanate or any other aliphatic polyisocyanates which are conventionally employed in the polyurethane art. Preferred are HMDI, isophorone diisocyanate and mixtures of para-xylene and meta-xylene diisocyanate.

As indicated, a chain extender is also employed in the polyurethane formulation. Any chain extender conventionally employed for this purpose may be used in the invention. Thus, suitable chain extenders include the low molecular weight polyols (as distinguished from the macropolyols described above), especially diols or triols, as represented by 1,4-butanediol, hydroquinone bis(2-hydroxyethyl) ether, ethylene glycol, diethylene glycol, triethylene glycol, propylene glycol, dipropylene glycol, hexylene glycol, 2-methyl-2-ethyl-1,3-propanediol, 2-ethyl-1,3-hexanediol, 1,5-pentanediol, thiodiglycol, 1,3-propanediol, 1,3-butanediol, 2,3-butanediol, neopentyl glycol, 1,2-dimethyl-1,2-cyclopentanediol, trimethylol propane, trimethylol ethane, 1,2,4-butane triol, 1,2,6-hexanetriol, pentaerythritol, dipentaerythritol, tripentaerythritol, anhydroaneaheptitol, mannitol, sorbitol, methylglucoside, and the like. Preferred chain extenders are the alkane diols having 3 to 6 carbon atoms.

The polyols and polyisocyanate are employed is such proportions as to provide an overall NCO/OH ratio in the range of from 0.90/1 to 1.1/1, preferably 1/1. The equivalence ratio of chain extender to macropolyol falls in the range of from 1/1 to 3/1.

The thio-tin organic compound is employed in the invention in amount effective to catalyze the gelling and cure (chain extension) of the mixture as described. Frequently from about 0.1 to 0.5 part of thio tin organic compound, per 0.1 equivalent of macropolyol, is suitable for this purpose, although other amounts may also be used.

The polyurethane formulation of the invention as initially prepared is thus a liquid composition which can be handled and processed using procedures and equipment of the kind conventionally used with vinyl plastisols, for example. Since the composition is stable at ambient temperature for at least 25 minutes, the material can be processed without troublesome premature gelation or solidification, which would cause fouling of the equipment and interfere with proper shaping operations such as casting, spreading, coating or injection. Even longer pot life, for example up to three hours at room temperature, is possible with compositions of the invention, especially those using higher molecular weight polyols and higher molecular weight diols such as 1,6-hexanediol as the chain extender.

A particularly valuable embodiment of the invention is concerned with the manufacture of urethane coated fabric. Thus, in a typical polyurethane coated fabric manufacturing process of the invention the solvent-free liquid polyurethane coating composition is applied to the release side of a release paper carrier, and then exposed to sufficient heat to result in partial gelation of the polyurethane layer, to the point where it is tacky to the touch. At that point the fabric to be coated is brought into contact with the tacky surface, using only sufficient pressure to insure complete contact between the two. Upon further heating the polyurethane coating reacts further to become sufficiently hardened to be able to be handled without damage. Usually a coating which can be handled is obtained upon heating for 30 seconds to 3 minutes at 375° to 300°F. Thereafter the composite is cooled to room temperature and the coated fabric is stripped from the release paper. The coating, even though it may be quite thin in comparison to conventional vinyl coatings, is essentially on the surface of the fabric rather than being embedded in the fabric to any significant extent. The finally cured product has the properties of a good quality polyurethane elastomer, having high tensile strength, good elongation and modulus, and high tear strength. It resists cracking even at low temperature. The product is light stable and does not undergo discoloration or embrittlement even after long periods of exposure in the Weather-ometer fadeometer and under ambient conditions. Although the product is described as cured it is normally thermoplastic (chain extended) and is not cross-linked in the sense that a thermosetting isocyanate-terminated polyurethane would be cross-linked by the action of moisture or other bi-functional curing agent. If some cross-linking is desired an agent such as trimethylol propane, or other material having a functionality greater than two, may be included. The composition contains no solvents but consists essentially 100% of solid-forming one-shot urethane components. The composition is of course unlike urethane foam compositions which are required to gel quickly after mixing so as to entrap the gas released in the foaming step.

In addition to being useful for making coated fabrics, the present composition may be used for such purposes as making unsupported cast films or cast objects of other desired shapes, for example by rotational casting procedures, as well as liquid injection molding procedures, and the like. The long pot life of the composition avoids premature gelation during the spreading or shaping operations, allowing sufficient time for adjusting equipment, handling molds, etc., and permitting easy clean up of excess or residual materials such as deposits of material on equipment surfaces.

The following examples will serve to illustrate the practice of the invention in more detail.

Example 1

The following ingredients are mixed together intimately:

| | Parts (by weight) |
|---|---|
| Polyester polyol | 124.4 |
| 1,4-Butanediol | 13.5 |
| Silicone surfactant | 2.0 |
| Catalyst | 0.2 |
| HMDI | 54.0 |

The polyester polyol is a copolyester of adipic and isophthalic acids with 1,4-butane glycol, having an hydroxyl number of 47. The silicone surfactant may be siloxane - oxyalkylene block copolymer as described in U.S. Pat. No. 3,377,296, Dwyer et al., Apr. 9, 1968, col. 6, ll. 29–37, as represented by such commercially available materials as DC 190 (trademark). The catalyst is dibutyltin S,S -bis(isooctyl mercaptoacetate) commercially available as Thermolite 31 (trademark). The HMDI is hydrogenated MDI, i.e., methylenebis (4-cyclohexyl-isocyanate), commercially available as Hylene W (trademark). The overall equivalency ratio of NCO to OH is 1.04/1; the equivalency ratio of low molecular weight diol to polyester polyol is 3/1. The resulting liquid mixture has a pot life of 60 minutes at ambient temperature (e.g., about 22°C.). The mixture is spread on a casting surface to make a film 6 mil thick which gels upon heating at 375°F. (190°C.) for 1 minute, after which it can be handled without damaging it. After aging for 1 week at room termperature typical properties of the solid elastomeric film are as follows:

| | |
|---|---|
| Tensile strength, psi | 7,080 |
| Elongation at break, % | 390 |
| Cold Crack (−40°F.[−40°C]) | no cracks |
| Modulus at 100% elongation, psi | 1,253 |
| 500 hr. Weatherometer - no discoloration or embrittlement | |
| 500 hr. Fadeometer - no discoloration or embrittlement | |

Example 2

This example illustrates the preparation of a coated fabric in accordance with the invention. In this case a polyether system, based on a poly tetramethylene ether glycol having a molecular weight of approximately 1,000, is used.

| | |
|---|---|
| PTMG 1000 | 50.0 |
| 1,4-Butane Diol | 6.75 |
| Silicone Surfactant | 2.0 |
| Thermolite 31 | 0.2 |
| Hylene W | 32.75 |

The ingredients are intimately blended and applied by a conventional knife over roll coater as a thin film (0.004 inch) onto a release paper. The release paper with the coating thereon is then passed through an oven at 300°F with a total time of 30 seconds in the oven. A napped fabric is applied (napped side down) to the tacky, partially cured polyurethane coating by means of suitable laminating equipment. The composite product is then passed through a second oven at a temperature of 350°F with a total time of 30 seconds in this second oven. After cooling to room temperature (72°F for example by passing over cooling drums) the polyurethane coated fabric is stripped continuously from the release paper and wound up into a roll.

The polyurethane coating described in this example had the following typical properties.

| | |
|---|---|
| Tensile Strength | 4,800 psi |
| Elongation | 350% |
| Modulus at 100% Elongation | 1050 psi |
| Cold Crack (−40°F) | No cracks |
| 500 Hr. Fadeometer | No discoloration or embrittlement |

The pot life (time to reach a viscosity of 50,000 cps) was 50 minutes.

Example 3

A series of mixtures are prepared according to the following formulation

| | Parts |
|---|---|
| Polyester Polyol | 86.5 |
| 1,6-Hexanediol | 7.4 |
| Silicone surfactant | 3.0 |

| | Parts |
|---|---|
| Hylene W | 29.5 |
| Catalyst | 0.2 |

The polyester polyol was 1,6-hexanediol adipate/isophthalic ester having an OH value of 65. Various compounds were added, including catalysts within the invention and compounds outside the invention (0.2 part) as follows:

i. Thio tin catalysts of the invention:

A. Thermolite 31 (trademark), dibutyltin S,S-bis (isooctyl mercaptoacetate).

B. Thermolite 66 (trademark) dibutyl tin mercapto ester.

C. Thermolite 831 (trademark), di-n-octyltin S,S-bis (isooctyl mercaptoacetate).

ii. Non-sulfur tin compounds outside the invention:

D. Thermolite 1 (trademark), dibutyltin diacetate.

E. Thermolite 12 (trademark), dibutyltin dilaurate.

F. Thermolite 26 (trademark), dibutyltin bis(-monobutyl maleate).

iii. Tributyltin compounds with sulfur on the chain but not directly attached to tin (outside the invention):

G. $(n-C_4H_9)_3Sn-CH_2CH_2CH_2-SCH_2$

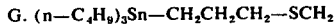
(H) $(n-C_4H_9)_3Sn-CH_2-S-\langle O \rangle$

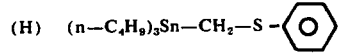
(I) $\langle O \rangle_{SO_2}-Sn(n-C_4H_9)_3$

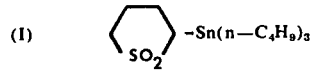
(J) $(n-C_4H_9)_3Sn-CH_2CH_2-SO_2-\langle O \rangle$

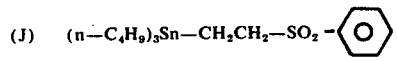
K. $[(n-C_4H_9)_3SnCH_2CH_2-]_2 SO$

(L) $(n-C_4H_9)_3 Sn-OS-\langle O \rangle$ (with =O on S)

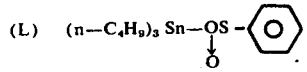

Compounds of type (iii), namely compounds G, H, I, J, K and L failed to catalyze the system at all, i.e., the mixture did not cure after 3 minutes in a 350°F. (177°C.) oven.

Mixtures containing type (ii) compounds, namely, D, E and F, and mixtures containing type (i) catalysts of the invention, namely, A, B and C, were blended and the viscosities of the mixtures were measured periodically to prepare graphs of the viscosity as a function of time. The viscosities of mixtures containing compounds D, E and F increased rapidly right from the start, reaching a value of 50,000 cps within about 10 minutes or less, indicating early gelation, i.e., short pot life that renders the mixtures unsuitable for normal factory processing operations. In contrast, the mixtures containing the A, B and C catalysts of the invention displayed substantially constant viscosities during the first 20 minutes or so and had increased only very slightly after 30 minutes. The viscosities began to increase more rapidly after 30 minutes, reaching a value of 50,000 cps after about 50–80 minutes (about 93 minutes at 75°F. [23.9°C.]) in the case of catalyst A). This demonstrates the long induction time (pot life) of the catalysts of the invention, in contrast to the type (ii) compounds which proceeded to cure substantially immediately (no appreciable pot life). At 100°F (38°C), the mixture containing catalyst A exhibited substantially no increase in viscosity until after about 25 minutes; thereafter the viscosity began to rise at an increasing rate, attaining a value of about 50,000 cps by about 50 minutes at 100 F.

I claim:

1. A curable solvent-free liquid polyurethane composition having a pot life of at least 25 minutes at room temperature consisting essentially of a mixture of a polyol and a monomeric hydrocarbon-containing aliphatic polyisocyanate containing, as a heat-activatable catalyst, a thio tin organic compound having sulfur directly attached to the tin, in an amount effective to catalyze the cure of the composition, the said catalyst having the formula

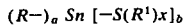
$(R-)_a Sn [-S(R^1)x]_b$ wherein:
R is an alkyl radical having 3 to 10 carbon atoms:
$R^1$ is an alkyl radical having 4 to 20 carbon atoms or a radical of the formula $-R^2COOR^3$ where $R^2$ is $(CH_2)n$, n being from 1 to 5, and $R^3$ is an alkyl radical having 4 to 18 carbon atoms;
x is zero or 1, a is 2 or 3, and b is 1 or 2; the equivalence ratio or isocyanate groups to hydroxyl groups in said composition being from 0.90:1 to 1.1:1, and the said composition being capable of curing in from 30 seconds to 3 minutes at corresponding temperatures of from 375° to 300°F to form a solid, chain extended lightstable polyurethane elastomer.

2. A composition as in claim 1 in which the said polyisocyanate is selected from the group consisting of methylene bis(4-cyclohexylisocyanate), isophorone diisocyanate and mixtures of para-xylene and meta-xylene diisocyanate.

3. A curable solvent-free liquid polyurethane composition as in claim 1 consisting essentially of a mixture of a macropolyol, a monomeric hydrocarbon-containing cycloaliphatic diisocyanate, and, as a chain extender, a low molecular weight diol.

4. A composition as in claim 3 in which the said macropolyol is a polyester glycol or a polyether glycol.

5. A composition as in claim 3 in which the said chain extender is an alkane diol having 3 to 6 carbon atoms.

6. A composition as in claim 3 in which the said diisocyanate is methylene bis(4-cyclohexylisocyanate).

7. A curable solvent-free liquid composition consisting essentially of a mixture of a macropolyol which is a polyester or polyether glycol having a molecular weight of from 500 to 2000, a monomeric hydrocarbon-containing aliphatic diisocyanate, and, as a chain extender, an alkane diol having from 3 to 6 carbon atoms, the equivalence ratio of isocyanate groups to hydroxyl groups in the said composition being from 0.90:1 to 1.1.:1 and the equivalence ratio of said macropolyol to said chain extender being from 1:1 to 1:3, the said mixture containing, in amount effective to catalyze the cure of the mixture, a thio tin organic compound of the formula $$(R-)_a Sn [-S(R^1)_x]_b$$

wherein:
R is an alkyl radical having 3 to 10 carbon atoms;
$R^1$ is an alkyl radical having 4 to 20 carbon atoms or a radical of the formula $-R^2COOR^3$ where $R^2$ is $(CH_2)_n$, $n$ being from 1 to 5, and $R^3$ is an alkyl radical having 4 to 18 carbon atoms;
$x$ is zero or 1, $a$ is 2 or 3, and $b$ is 1 or 2, the said composition have a pot life of at least 25 minutes at room temperature and being capable of curing in from 30 seconds to 3 minutes at corresponding temperatures of from 375° to 300°F. to form a solid, chain extended light-stable polyurethane elastomer.

8. A composition as in claim 7 in which the said diisocyanate is methylene bis(4-cyclohexylisocyanate.

9. A composition as in claim 7 in which the said diisocyanate is isophorone diisocyanate.

10. A composition as in claim 7 in which the said diisocyanate is a mixture of para-xylene and metaxylene diisocyanate.

11. A composition as in claim 7 in which the said catalyst is dibutyltin S,S-bis(isooctyl thioglycolate).

12. A composition as in claim 7 in which the said catalyst is dibutyltin S,S-bis(dodecyl mercaptide).

13. A composition as in claim 7 in which the said catalyst is di(n-octyl)tin S,S-bis(isooctyl thioglycolate).

14. A composition as in claim 7 in which the said catalyst is dibutyltin sulfide.

15. A composition as in claim 7 in which the said chain extender is 1,4-butanediol.

16. A composition as in claim 7 in which the said chain extender is 1,6-hexanediol.

17. A cured composition as in claim 1 which is a solid, light-stable, chain extended polyurethane elastomer.

18. A shaped object which is a composition as in claim 7 cured to a solid, light-stable, chain extended polyurethane elastomer.

19. In a method of making a shaped object by reacting a composition consisting essentially of a mixture of a macroglycol, a monomeric hydrocarbon-containing aliphatic polyisocyanate, a bifunctional chain extender, and a catalyst effective to cure the mixture to form a solid chain extended light-stable polyurethane elastomer, wherein the composition is mixed in liquid form and is thereafter shaped and cured in the desired shape, the improvement comprising effecting the reaction in the presence of an effective amount of a thio tin organic compound having sulfur directly attached to the tin, the said organic compound having the formula:

$$(R-)_a SN[-S(R^1)_x]_b$$

wherein:
R is an alkyl radical having 3 to 10 carbon atoms;
$R^1$ is an alkyl radical having 4 to 20 carbon atoms or a radical of the formula $-R^2COOR^3$ where $R^2$ is $(CH_2)_n$, $n$ being from 1 to 5, and $R^3$ is an alkyl radical having 4 to 18 carbon atoms;
$x$ is zero or 1, $a$ is 2 or 3, and $b$ is 1 or 2; the equivalence ratio or isocyanate groups to hydroxyl groups in said composition being from 0.9:1 to 1.1:1, whereby the composition has a pot life of at least 25 minutes at room temperature but cures rapidly at corresponding temperatures of from 300° to 375°F.

20. A method as in claim 19 wherein the said shaped object is a coating of the said composition on a fabric.

21. In a method of making a solid polyurethane article by reacting a curable liquid composition consisting essentially of a polyester or polyether glycol, a monomeric hydrocarbon-containing cycloaliphatic diisocyanate, a chain extender which is an alkane diol having 3 to 6 carbon atoms, and an effective amount of a heat activatable catalyst for the cure of the composition, wherein the said liquid is first shaped at ambient temperature and thereafter heated to an elevated temperature to cure the composition in a desired shape, the improvement comprising effecting the reaction in the presence of, as the catalyst, an organo tin compound of the formula $$(R-)_a Sn[-S(R^1)_x]_b$$

wherein:
R is an alkyl radical having 3 to 10 carbon atoms;
$R^1$ is an alkyl radical having 4 to 20 carbon atoms or a radical of the formula $-R^2COOR^3$ where $R^2$ is $(CH_2)_n$, $n$ being from 1 to 5, and $R^3$ is an alkyl radical having 4 to 18 carbon atoms;
$x$ is zero or 1, $a$ is 2 or 3, and $b$ is 1 or 2; the equivalence ratio of isocyanate groups to hydroxyl groups in the said mixture being from 0.90:1 to 1.1:1 whereby the said liquid has a pot life of at least 25 minutes at 22°C. but cures rapidly at a temperature of from 300° to 375°F. to form a solid, chain extended light-stable polyurethane elastomer.

22. A method of making a light-stable polyurethane coated fabric comprising providing a solvent-free liquid mixture of a macropolyol selected from the group consisting essentially of polyester and polyether glycols having a molecular weight of from 500 to 2000, a monomeric hydrocarbon-containing aliphatic diisocyanate, a chain extender which is an alkane diol having 3 to 6 carbon atoms, and a catalyst in amount effective to catalyze the cure of the said mixture at a curing temperature of from 300° to 375°F. the said catalyst being an organotin compound of the formula $$(R-)_a Sn[-S(R^1)_x]_b$$

wherein:
R is an alkyl radical having 3 to 10 carbon atoms;
$R^1$ is an alkyl radical having 4 to 20 carbon atoms or a radical of the formula $-R^2COOR^3$ where $R^2$ is $(CH_2)_n$, $n$ being from 1 to 5, and R is an alkyl radical having 4 to 18 carbon atoms;
$x$ is zero or 1, $a$ is 2 or 3, and $b$ is 1 or 2, the equivalence ratio of isocyanate groups to hydroxyl groups in the said mixture being from 0.90:1 to 1.1:1 and the equivalence ratio of said macropolyol to said alkane diol being from 1:1 to 1:3, the said mixture being characterized by a pot life of at least 25 minutes at 22°C., thereafter applying the said liquid mixture to a fabric, and heating the resulting assembly to curing temperature to cure the applied mixture to a solid elastomeric state.

23. A method as in claim 22 in which the liquid mixture is first spread as a coating on a release paper, then heated to gel the liquid to a state in which it is tacky to the touch, the fabric to be coated is applied to the surface of the liquid, the assembly is then heated to cure the liquid to a solid state, and the thus-coated fabric is thereafter cooled to room temperature and separated from the release paper.

24. A method as in claim 22 in which the said macropolyol is a polyester glycol.

25. A method as in claim 22 in which the said macropolyol is a polyether glycol.

26. A method as in claim 22 in which the said diisocyanate is a cycloaliphatic diisocyanate.

27. A method as in claim 22 in which the said diisocyanate is methylenebis(4-cyclohexylisocyanate).

28. A method as in claim 22 in which the said diisocyanate is isophorone diisocyanate.

29. A method as in claim 22 in which the said diisocyanate is a mixture of para-xylene and meta-xylene diisocyanate.

30. A method as in claim 22 in which the said catalyst is dibutyltin S,S-bis(isooctyl thioglycolate).

31. A method as in claim 22 in which the said catalyst is dibutyltin S,S-bis(dodecyl mercaptide).

32. A method as in claim 22 in which the said catalyst is di(n-octyl) tin S,S-bis(isooctyl thioglycolate).

33. A method as in claim 22 in which the said catalyst is dibutyltin sulfide.

34. A method as in claim 22 in which the said chain extender is 1,4-butanediol.

35. A method as in claim 22 in which the said chain extender is 1,6-hexanediol.

36. A method as in claim 22 in which the said macropolyol is a polyester glycol, the said diisocyanate is methylene bis(4-cyclohexylisocyanate), the said chain extender is 1,4-butanediol, and the said catalyst is dibutyltin S,S-bis(isooctyl thioglycolate).

37. A method as in claim 22 in which the said macropolyol is a polyether glycol, the said diisocyanate is methylene bis(4-cyclohexylisocyanate), the said chain extender is 1,4-butanediol, and the said catalyst is dibutyltin S,S-bis(isooctyl thioglycolate).

* * * * *